United States Patent
Sato et al.

(10) Patent No.: US 6,897,397 B2
(45) Date of Patent: May 24, 2005

(54) WIRE ELECTRIC DISCHARGE MACHINING METHOD AND WIRE ELECTRIC DISCHARGE MACHINE

(75) Inventors: Tatsushi Sato, Tokyo (JP); Junichi Shibata, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/469,386

(22) PCT Filed: Nov. 1, 2001

(86) PCT No.: PCT/JP01/09577

§ 371 (c)(1),
(2), (4) Date: Aug. 29, 2003

(87) PCT Pub. No.: WO03/037558

PCT Pub. Date: May 8, 2003

(65) Prior Publication Data

US 2004/0256362 A1 Dec. 23, 2004

(51) Int. Cl.⁷ .................................................. B23H 7/02
(52) U.S. Cl. .................................. 219/69.12; 219/69.17
(58) Field of Search ........................... 219/69.12, 69.17

(56) References Cited

U.S. PATENT DOCUMENTS 4,292,491 A * 9/1981 Tanaka et al. ........... 219/69.12

5,185,507 A  2/1993 Yasui

FOREIGN PATENT DOCUMENTS

| JP | 51-63094 A | 6/1976 |
| JP | 59-76724 A | 5/1984 |
| JP | 63-68323 A | 3/1988 |
| JP | 04-189421 | 7/1992 |

* cited by examiner

Primary Examiner—Geoffrey S. Evans
(74) Attorney, Agent, or Firm—Sughrue Mion, PLLC

(57) ABSTRACT

The present invention provides a wire electric discharge machining apparatus for machining a workpiece (1) by electric discharge in which driving means (9) relatively moves a wire electrode (5) and the workpiece (1) while machining power supplying means (10) supplies a working energy between the wire electrode (5) and the workpiece (1). The wire electric discharge machining apparatus comprises working energy adjusting means (13) for decreasing the working energy per unit movement distance of the wire electrode (5) when the distance between an approach point (O) connecting a runway portion (4) and a machining configuration portion (2) on the relative movement passage of the wire electrode (5) and the workpiece (1) and a center of the wire electrode (5) in the machining configuration portion (2) is within a range where the machining volume of the workpiece (1) per unit movement distance of the wire electrode (5) is decreased. Therefore, it is possible to suppress an intrusion (6) from being formed on a machined face of the workpiece (1) near the approach point (O).

10 Claims, 7 Drawing Sheets

| 2ND CUT | x (μm) | 179 | 164 | 144 | 116 | 69 |
|---|---|---|---|---|---|---|
| | Dty (%) | 90 | 70 | 50 | 30 | 10 |
| 3RD CUT | x (μm) | 82 | 73 | 62 | 48 | 28 |
| | Dty (%) | 90 | 70 | 50 | 30 | 10 |

WIRE ELECTRIC DISCHARGE MACHINING METHOD AND WIRE ELECTRIC DISCHARGE MACHINE

TECHNICAL FIELD

The present invention relates to improvements in a wire electric discharge machining method and apparatus that can suppress an intrusion from being formed on a machined face of a workpiece.

BACKGROUND ART

First of all, the intrusion formed on the machined face of the workpiece in the wire electric discharge machining will be described. FIG. 6 is an explanatory view showing a relative movement passage (hereinafter referred to as an electrode passage) between a wire electrode and the workpiece in making the wire electric discharge machining. In FIG. 6, reference numeral 1 denotes the workpiece, 2 denotes a machining configuration portion (hereinafter referred to as a configuration portion) on the electrode passage for machining the workpiece 1 in an intended contour shape, 3 denotes a point for starting the machining (hereinafter referred to as a machining start point) such as a machining start hole, and 4 denotes a runway passage portion (hereinafter referred to as a runway portion) of the electrode passage leading from the machining start point 3 to the configuration portion 2. Reference character O denotes a connection point (hereinafter referred to as an approach point) between the configuration portion 2 and the runway portion 4. FIG. 7 is an enlarged view near the approach point O of FIG. 6. The same numerals designate the same or like parts as in FIG. 6. In FIG. 7, reference numeral 5 denotes a wire electrode and 6 denotes an intrusion.

As well known, the wire electric discharge machining is a working method of cutting out the workpiece 1, using the wire electrode 5 like a jigsaw. As shown in FIG. 6, not only the configuration portion 2 but also the runway portion 4 are worked.

In the configuration portion 2 of the ordinary wire electric discharge machining, the path is spaced away from the machining configuration by a certain distance (hereinafter referred to as an offset amount) in consideration of the radius of wire electrode 5, discharge gap length, and finishing allowance, and the machining is made by moving the center of the wire electrode 5 along this offset path. That is, the wire electrode 5 is moved from the machining start point 3 through the runway portion 4, from the approach point O to the configuration portion 2, rounds the configuration portion 2, and again moved from the approach point O through the runway portion 4 back to the machining start point 3, as shown in FIG. 7. If the finish machining is needed, the wire electrode 5 is repetitively moved along the electrode passage where an offset amount is set up in succession for every machining electric discharge conditions for use.

By the way, when the wire electrode 5 is moved around the configuration portion 2 as previously described, at the time of rounding the configuration portion 2, the wire electrode only once passes the configuration portion 2 other than the approach point O, but passes the approach point O twice. When the wire electrode 5 passes the approach point O at the second time, the workpiece 1 to be machined has been already removed when the wire electrode 5 passes the approach point O at the first time, so that the discharge occurs on the already machined face, over-cutting the machined face. Accordingly, the intrusion 6 is formed on the machined face of the workpiece 1 near the approach point O, making the machining precision worse.

FIG. 8 is an explanatory view showing a constitution of the conventional wire electric discharge machining apparatus as disclosed in JP-A-4-189421, and explaining how to suppress the intrusion from being formed. In FIG. 8, reference numeral 1 denotes the workpiece, 5 denotes the wire electrode, 7 denotes wire electrode supplying means, 8 denotes working fluid supplying means, 9 denotes driving means, 10 denotes machining power supplying means, 11 denotes control means, and 12 denotes program automatic conversion means. FIG. 9 is an explanatory view showing the electrode passage in the wire electric discharge machining apparatus of FIG. 8. In FIG. 9, reference numeral 1 denotes the workpiece, 2 denotes the configuration portion, 3 denotes the machining start point, and 4A and 4B denote the runway portion. Reference sign OA denotes a first approach point, and OB denotes a second approach point.

The operation will be now described. The wire electrode supplying means 7 of FIG. 8 delivers the wire electrode 5 with an appropriate tension applied to the wire electrode 5 while being traveled at a predetermined rate. The working fluid supplying means 8 supplies a working fluid between the wire electrode 5 and the workpiece 1. The machining power supplying means 10 applies a pulsed voltage between the wire electrode 5 and the workpiece 1 to generate a discharge. The program automatic conversion means 12 extracts the approach point O from a program describing the electrode passage stored in the control means 11, based on the set information of the offset amount, thereby grasping the runway portion 4 and the configuration portion 2, when making the machining as shown in FIG. 6. Then, the first approach point OA and the second approach point OB are set up on the configuration portion 2, the paths of the runway portions are connected to two approach points (runway portions 4A and 4B), and the program is changed to delete the electrode passage in the configuration portion between two approach points (between the approach points OA and OB in FIG. 9), and stored in the control means 11 again.

That is, when the electrode passage near the approach point is as shown in FIGS. 6 and 7, the electrode passage is changed as shown in FIG. 9. The control means 11 drives the driving means 9 to relatively move the wire electrode 5 and the workpiece 1 along the changed electrode passage.

As above described, in the conventional wire electric discharge machining apparatus, the program automatic conversion means 12 provides the electrode passage program with the first approach point OA through which the wire electrode 5 passes in entering from the runway portion 4A to the configuration portion 2 and the second approach point OB through which it passes in returning from the configuration portion 2 to the runway portion 4B, and the program is changed not to pass the wire electrode 5 through the configuration portion between two approach points, suppressing the intrusion from being formed on the machined face of the workpiece 1.

With this conventional method, since the electrode passage program is changed to set up two approach points, there is a risk of causing a new interference between the wire electrode and the workpiece. Also, the workpiece may be over-cut in one part and under-cut in the other part in the configuration between two approach points, resulting in a problem that it is difficult to adjust the distance between the approach points.

DISCLOSURE OF THE INVENTION

This invention has been achieved to solve the above-mentioned problems, and it is an object of the invention to provide a wire electric discharge machining method and apparatus in which it is possible to suppress intrusion from being formed on the machined face of the workpiece without changing the electrode passage program.

This invention provides a wire electric discharge machining method for machining a workpiece by electric discharge by relatively moving a wire electrode and the workpiece while supplying a working energy between the wire electrode and the workpiece, characterized in that the working energy per unit movement distance of the wire electrode is decreased when the distance between an approach point connecting a runway portion and a machining configuration portion on the relative movement passage and a center of the wire electrode in the machining configuration portion is within a range where the machining volume of the workpiece per unit movement distance of the wire electrode is decreased.

Also, this invention provides a wire electric discharge machining method for machining a workpiece by electric discharge by relatively moving a wire electrode and the workpiece while supplying a working energy between the wire electrode and the workpiece, characterized in that the working energy per unit movement distance of the wire electrode is decreased when the distance between an approach point connecting a runway portion and a machining configuration portion on the relative movement passage and a center of the wire electrode in the machining configuration portion is within a second range that is set to be smaller than a range where the machining volume of the workpiece per unit movement distance of the wire electrode is decreased.

The wire electric discharge machining method according to the invention is characterized in that the working energy is decreased, as the distance between the approach point and the center of the wire electrode is smaller.

Also, the wire electric discharge machining method according to the invention is characterized in that the working energy is decreased in accordance with an adjustment amount that is preset depending on the machining conditions.

Also, the wire electric discharge machining method according to the invention is characterized in that the working energy is decreased at least either when the wire electrode passes the approach point at the first time to enter from the runway portion to the machining configuration portion on the relative movement passage, or when it passes the approach point at the second time to return from the machining configuration portion to the runway portion on the relative movement passage.

The present invention provides a wire electric discharge machining apparatus for machining a workpiece by electric discharge in which driving means relatively moves a wire electrode and the workpiece while machining power supplying means supplies a working energy between the wire electrode and the workpiece, characterized by comprising working energy adjusting means for decreasing the working energy per unit movement distance of the wire electrode when the distance between an approach point connecting a runway portion and a machining configuration portion on the relative movement passage and a center of the wire electrode in the machining configuration portion is within a range where the machining volume of the workpiece per unit movement distance of the wire electrode is decreased.

Also, this invention provides a wire electric discharge machining apparatus for machining a workpiece by electric discharge in which driving means relatively moves a wire electrode and the workpiece while machining power supplying means supplies a working energy between the wire electrode and the workpiece, characterized by comprising working energy adjusting means for decreasing the working energy per unit movement distance of the wire electrode when the distance between an approach point connecting a runway portion and a machining configuration portion on the relative movement passage and a center of the wire electrode in the machining configuration portion is within a second range that is set to be smaller than a range where the machining volume of the workpiece per unit movement distance of the wire electrode is decreased.

The wire electric discharge machining apparatus according to the invention is characterized in that the working energy adjusting means decreases the working energy as the distance between the approach point and the center of the wire electrode is smaller.

Also, the wire electric discharge machining apparatus according to the invention is characterized in that the working energy adjusting means decreases the working energy in accordance with an adjustment amount that is preset depending on the machining conditions.

Also, the wire electric discharge machining apparatus according to the invention is characterized in that the working energy adjusting means decreases the working energy at least either when the wire electrode passes the approach point at the first time to enter from the runway portion to a machining configuration portion on the relative movement passage, or when it passes the approach point at the second time to return from the machining configuration portion to the runway portion on the relative movement passage.

The wire electric discharge machining method and apparatus according to this invention are constituted in the above manner, whereby it is possible to suppress intrusion from being formed on the machined face of the workpiece near the approach point, resulting in the effect that the working precision is enhanced.

BEST MODE FOR CARRYING OUT THE INVENTION

Figure 1:
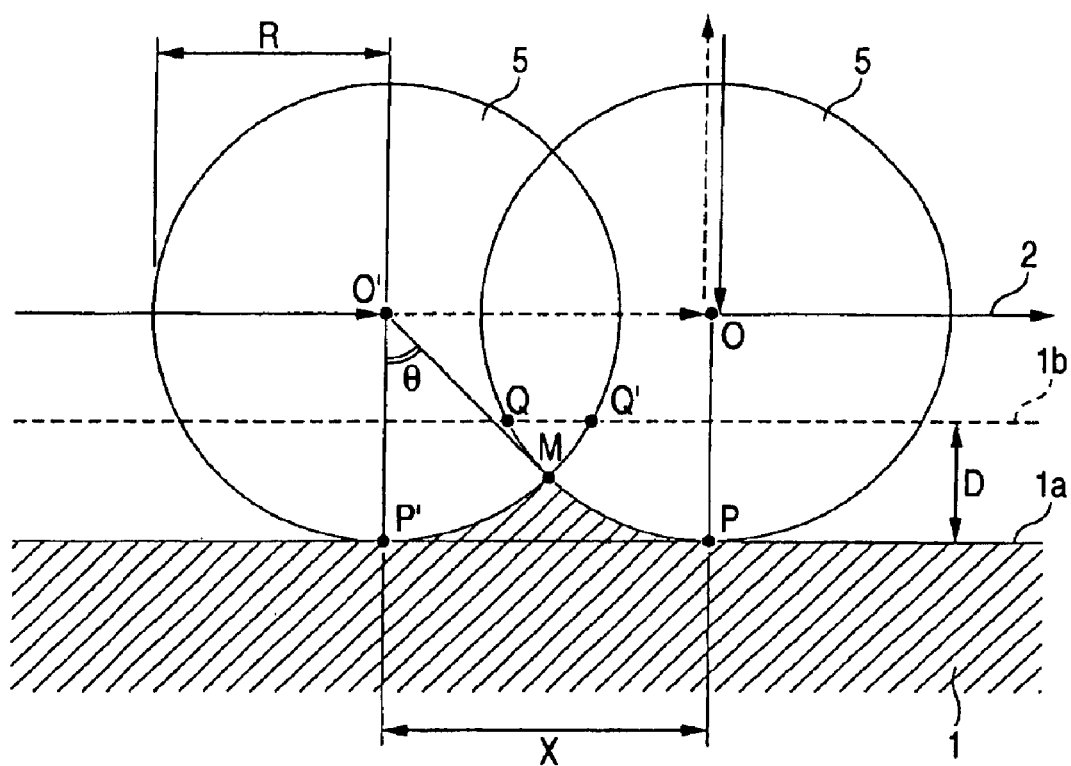
FIG. 1 is an explanatory view showing how to machine the workpiece near the approach point.

First of all, a principle of this invention will be described below. FIG. 1 is an explanatory view showing how to make the machining near an approach point in a second or later cut. In FIG. 1, reference numeral 1 denotes a workpiece, 1a denotes a machined face, 1b denotes a previous machined face, 2 denotes a configuration portion, and 5 denotes a wire electrode. Reference character R denotes a radius of the wire electrode 5. For simplicity, the discharge gap length is contained in the radius R of the wire electrode 5. Also, reference character D denotes a working depth, O denotes an approach point, P denotes a contact point between the wire electrode 5 and the machined face 1a of the workpiece 1, Q denotes an intersection point between the wire electrode 5 and the previous machined face 1b, and x denotes the distance between the approach point O and the center of the wire electrode 5 in the configuration portion 2. Also, O', P', and Q' correspond to the points O, P and Q when the wire electrode 5 is at a position distance x ahead of the approach point O, and M denotes an intersection point between arc PQ and arc P'Q'.

Figures 5, 6:
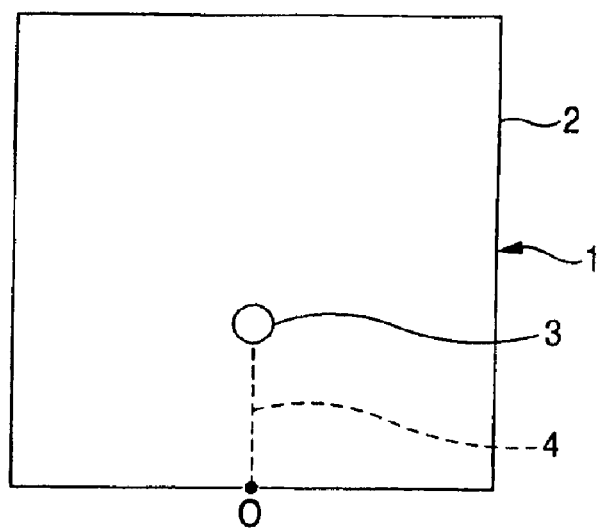
FIG. 5 shows one example of a working energy charge ratio table.
FIG. 6 is an explanatory view showing an electrode passage in making the wire electric discharge machining.
Figure 7:
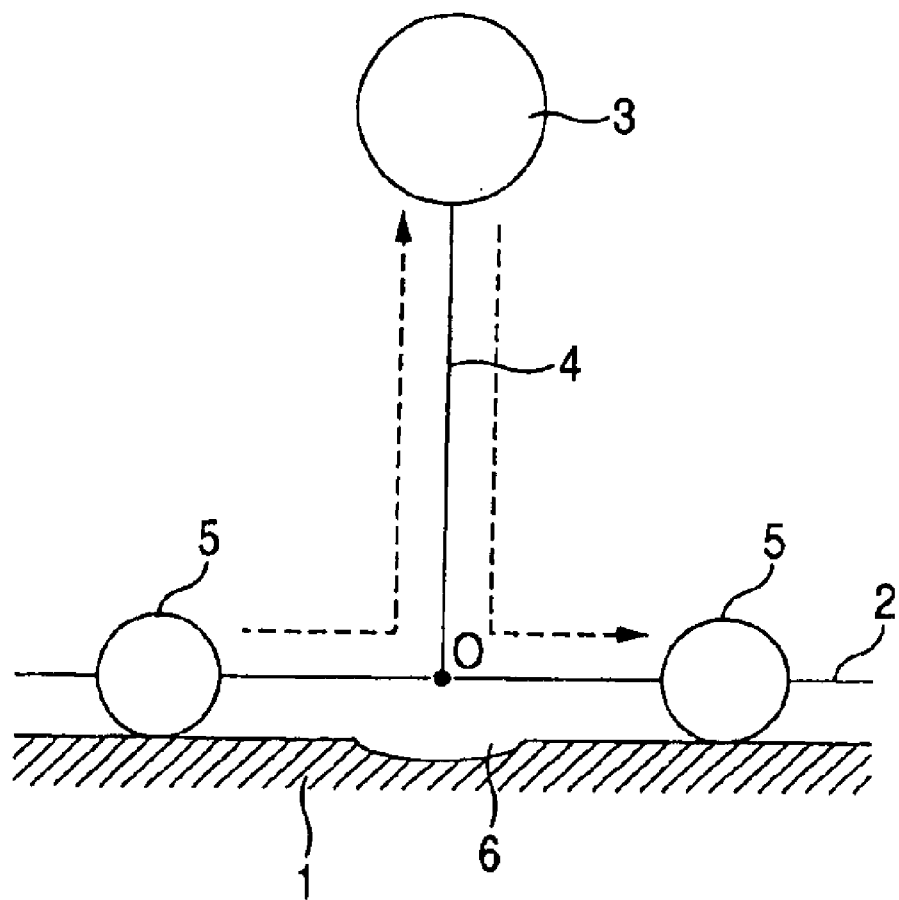
FIG. 7 is an enlarged view near the approach point of FIG. 6.

For example, the center of the wire electrode 5 is moved via the approach point O to pass almost round the configuration portion 2 and reach the point O' of FIG. 1, as in the electrode passage of FIG. 6. Usually, a portion of the workpiece 1 opposed to arc P'Q' is machined, but since the workpiece 1 is already machined when the wire electrode 5 passes the approach point O, as will be clear from FIG. 1, the wire electrode 5 is opposed to the workiece 1 only over the arc P'M', when the center of the wire electrode 5 reaches the point O'. Such a decrease in the machining volume per unit movement distance occurs in the case of $x<2\cdot\{R^2-(R-D)^2\}^{(1/2)}$. Though the machining volume is decreased, a constant working energy is charged, so that the intrusion is possibly formed. Accordingly, it is possible to suppress the intrusion on the machined face of the workpiece 1 from being formed near the approach point O by decreasing the working energy corresponding to the machining volume.

Figure 2A:
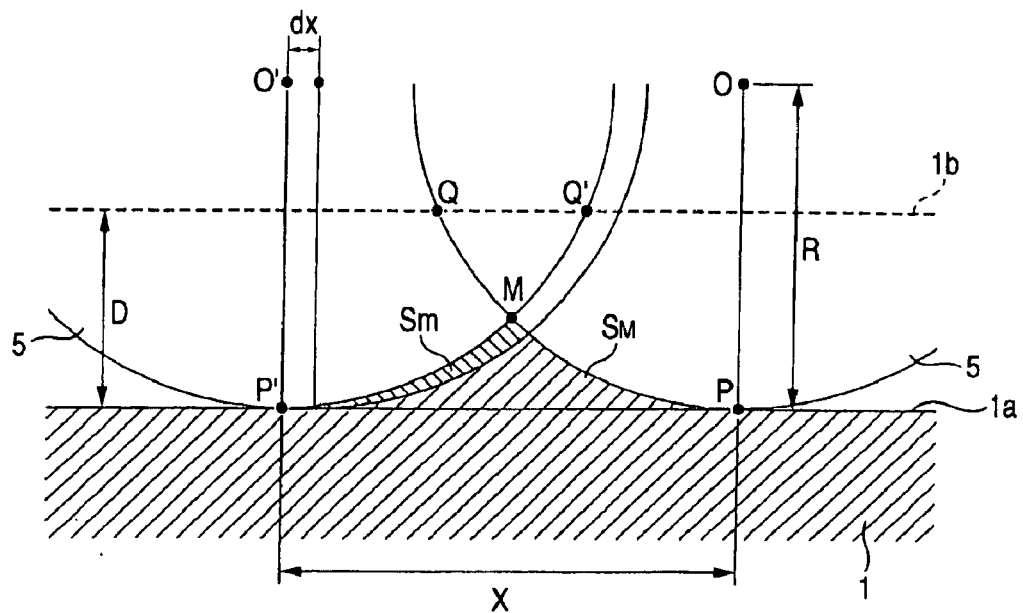
FIGS. 2A and 2B are explanatory views for explaining a way of decreasing the working energy near the approach point in a wire electric discharge machining method and apparatus according to an embodiment of this invention.
Figure 2B:
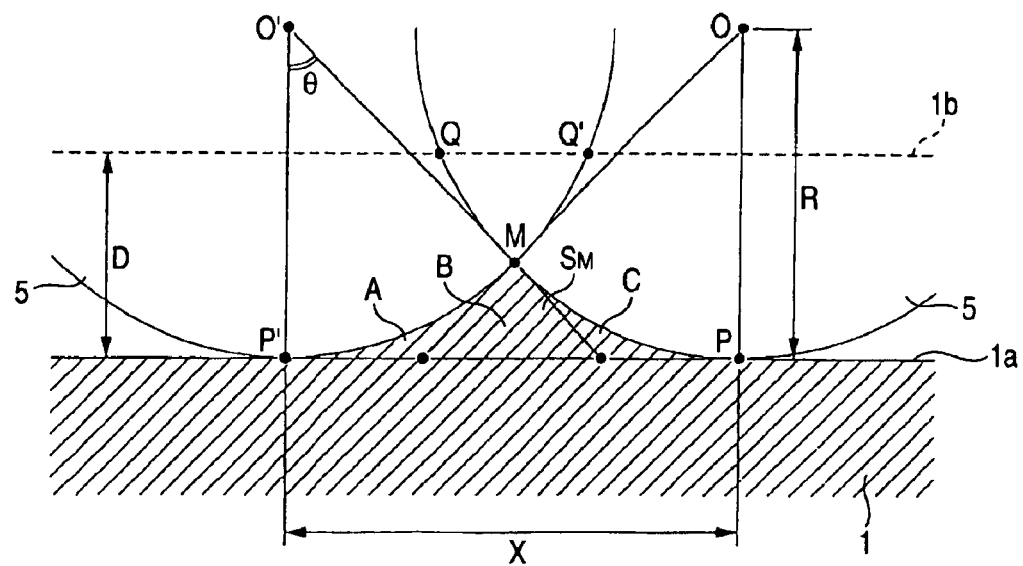

FIGS. 2A and 2B are explanatory views for explaining a method of decreasing the working energy near the approach point in a wire electric discharge machining method and apparatus according to an embodiment of this invention. The same numerals designate the same or like parts as in FIG. 1. In FIG. 2A, dx denotes a minute distance by which the wire electrode 5 proceeds from the point O', SM denotes an area surrounded by the arc PM, the arc P'M and the line PP', and Sm denotes a machined volume when the center of the wire electrode 5 reaches the point O'. The machined volume is represented by the cross sectional area of the machining portion on a plane perpendicular to the length direction of the wire electrode 5, with the plate thickness as a unit length.

In the case of the ordinary machining where the wire electrode 5 does not come to the already machined portion at the approach point O, the machining volume Sn is represented by the following expression (1).

$$Sn=D\cdot dx \tag{1}$$

On the other hand, since the machining volume Sm when the center of the wire electrode 5 reaches the point O' is equal to an amount of decrease due to the minute distance dx of area SM surrounded by the arc PM, arc P'M and line PP', the following expression (2) holds.

$$Sm=(dSM/dx)\cdot dx \tag{2}$$

The area SM is divided into A portion surrounded by line OM, line PP' and arc P'M, B portion surrounded by line OM, line O'M and line PP' and C portion surrounded by line O'M, line PP' and arc PM, as shown in FIG. 2B. If it is assumed that the area of A portion and the area of B portion, which are equal, is assumed as SA, the area of B portion is SB, and the angle made between line O'P' and line O'M is θ, the following expression (3) holds.

$$(1/2)\cdot R^2 \tan \theta = R^2\theta/2 + SA + SB \tag{3}$$

Since B portion is an isosceles triangle with the height R(1−cos θ) and apex angle θ, the following expression (4) holds.

$$SB=R^2(1-\cos \theta)^2 \tan \theta \tag{4}$$

From the expressions (3) and (4), the area SM=2SA+SB is represented by the following expression (5).

$$SM=R^2\{2 \sin \theta - \sin \theta\cos \theta - \theta\} \tag{5}$$

Both sides of the expression (5) are differentiated by x, and in consideration of x/2=R sin θ, the following expression (6) holds.

$$dSM/dx=R(1-\cos \theta) \tag{6}$$

Also, if the working energy charge ratio Dty to the ordinary machining time is set to be equal to the machining volume ratio, it is considered that formation of intrusion on the machined face of the workpiece is suppressed, whereby the following expression (7) holds.

$$Dty=Sm/Sn \tag{7}$$

Accordingly, from the expressions (2), (6) and (7), in consideration of $\cos \theta=(R^2-(x/2)^2)^{(1/2)}/R$, it follows that the relationship between the distance x from the approach point O and the working energy charge ratio Dty is represented by the expression (8).

$$Dty=\{R-(R^2-(x/2)^2)^{(1/2)}\}/D \tag{8}$$

Figure 3:
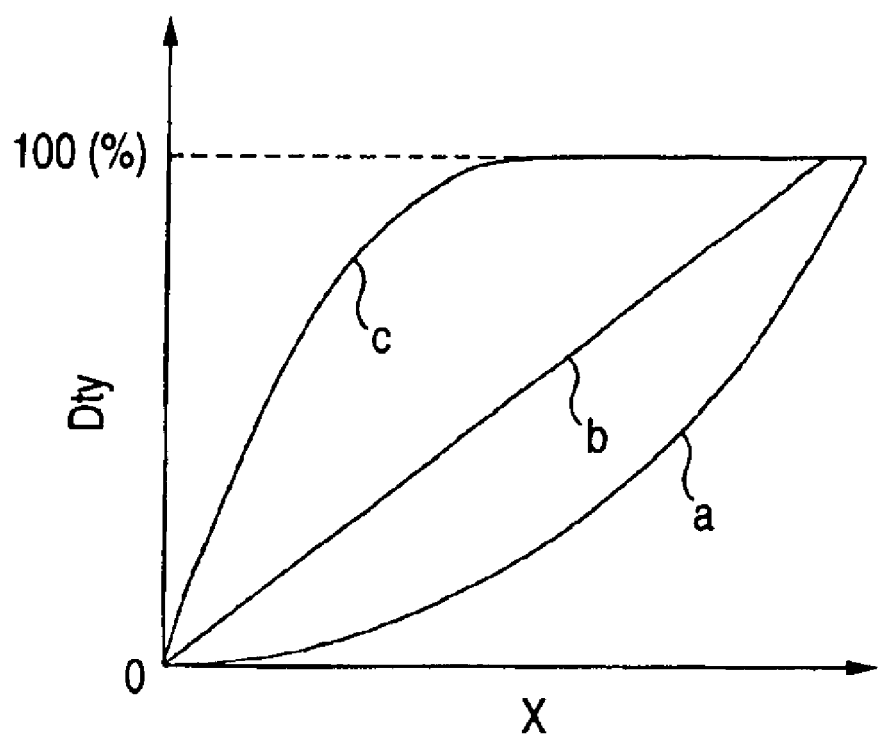
FIG. 3 is a graph showing the relationship between the distance x from the approach point and the working energy charge ratio Dty.

FIG. 3 is a graph showing the relationship between the distance x from the approach point O and the working energy charge ratio Dty. Curve a of FIG. 3 represents the relationship of the expression (8). That is, the working energy charge ratio Dty may be decreased like a parabola, such as curve a, as the distance x to the approach point is smaller.

The relationship of the expression (8) is involved in the case where the machined face of the workpiece is fully planar, but since the machined face before the finishing has actually some irregularities, the workpiece may not reside evenly in a machining depth direction. For example, when the machined face is undulated as directly after the rough machining, it is considered that the machining volume is increased in proportion to the distance from the machined surface. Therefore, the working energy charge ratio Dty should be linearly decreased, as the distance x to the approach point is smaller, as indicated by b in FIG. 3. In the case where the machined face of the workpiece is covered with fine craters, when the finish machining is performed very thin to the extent of the depth of these craters, it is considered that the workpiece scarcely exists near the machined surface, with the machining volume being possibly abruptly increased as the machining depth is increased, whereby the working energy charge ratio Dty should be sharply decreased as closer to the approach point, as indicated by c in FIG. 3.

In this manner, the setting of the working energy charge ratio Dty near the approach point O needs to be adjusted in accordance with the machining conditions, in which it is only necessary that the working energy is decreased as closer to the approach point. Also, the amount of adjusting the working energy according to the machining conditions may be preset through the experiments.

In the case of operating a corner control typically employed to precisely machine a curvature of the configuration portion in the recent wire electric discharge machining near the approach point, the working energy is controlled to be increased, because the vicinity of the approach point is not corner but regarded as in-corner, whereby formation of intrusion on the machined face of the workpiece near the approach point is further suppressed.

As above described, the principle of this invention is that the formation of intrusion on the machined face of the workpiece near the approach point is suppressed by decreasing the working energy as coming closer to the approach point.

Figure 4:
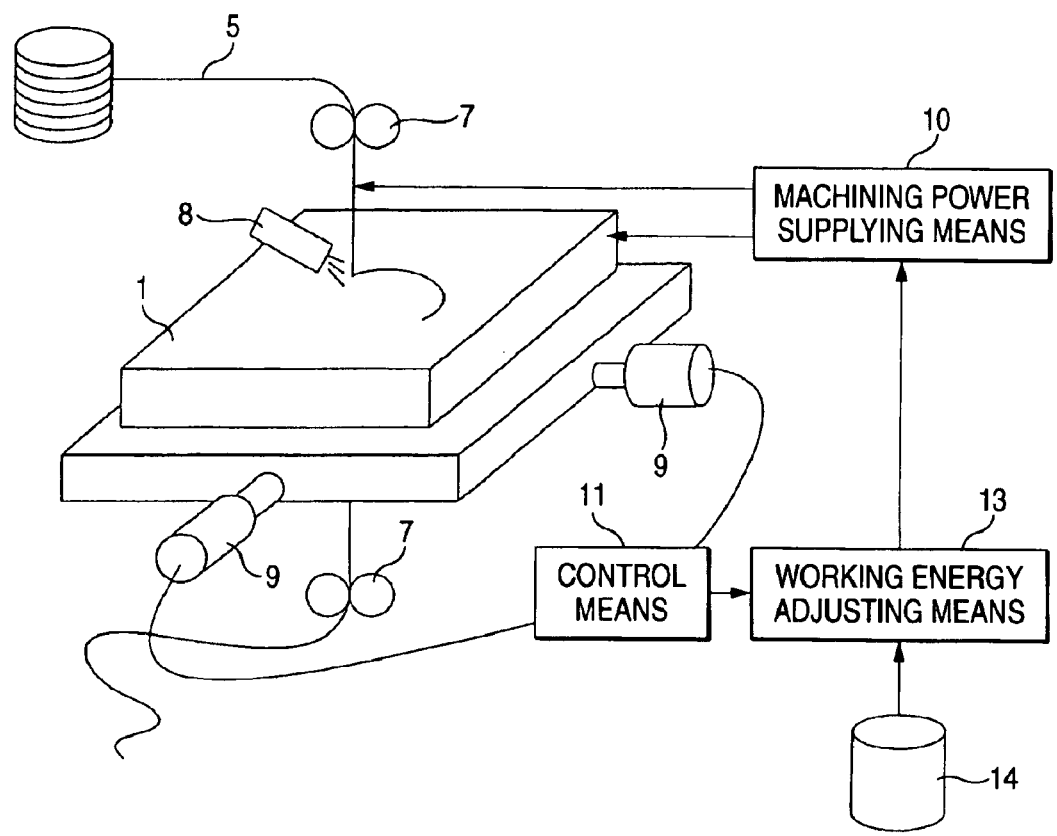
FIG. 4 is an explanatory view showing a constitution of the wire electric discharge machining apparatus according to the embodiment of this invention.

FIG. 4 is an explanatory view showing a constitution of a wire electric discharge machining apparatus according to the embodiment of this invention.

In FIG. 4, reference numeral 1 denotes the workpiece, 5 denotes the wire electrode, 7 denotes the wire electrode supplying means, 8 denotes the working fluid supplying means, 9 denotes the driving means, 10 denotes the machining power supplying means, 11 denotes the control means, 13 denotes a working energy adjusting means, and 14 denotes a working energy charge ratio table.

FIG. 5 shows one example of the working energy charge ratio table 14. In the case of a second cut that is the finishing after rough machining and a third cut that is the finishing after the second cut, the relationship between the distance x from the approach point and the working energy charge ratio Dty is shown. That is, in the case of the third cut, when the distance x from the approach point is beyond 82 $\mu$m, the working energy charge ratio Dty is 100%, or when the normal working energy is charged, while the distance x from the approach point is 82 $\mu$m or less, the working energy charge ratio Dty is 90%, or when the working energy is reduced by 10% from the normal time; the distance x from the approach point is 73 $\mu$m or less, 62 $\mu$m or less, 48 $\mu$m or less, and 28 $\mu$m or less, the working energy charge ratio Dty is 70%, 50%, 30% and 10%, respectively. Accordingly, the working energy is gradually decreased at five stages, as the distance x from the approach point is shorter. In this manner, the working energy charge ratio table 14 of FIG. 5 contains the working energy charge ratio changed at five stages in accordance with the distance x from the approach point, but the number of stages may be arbitrary and appropriately set in accordance with a desired machining precision.

Figure 8:
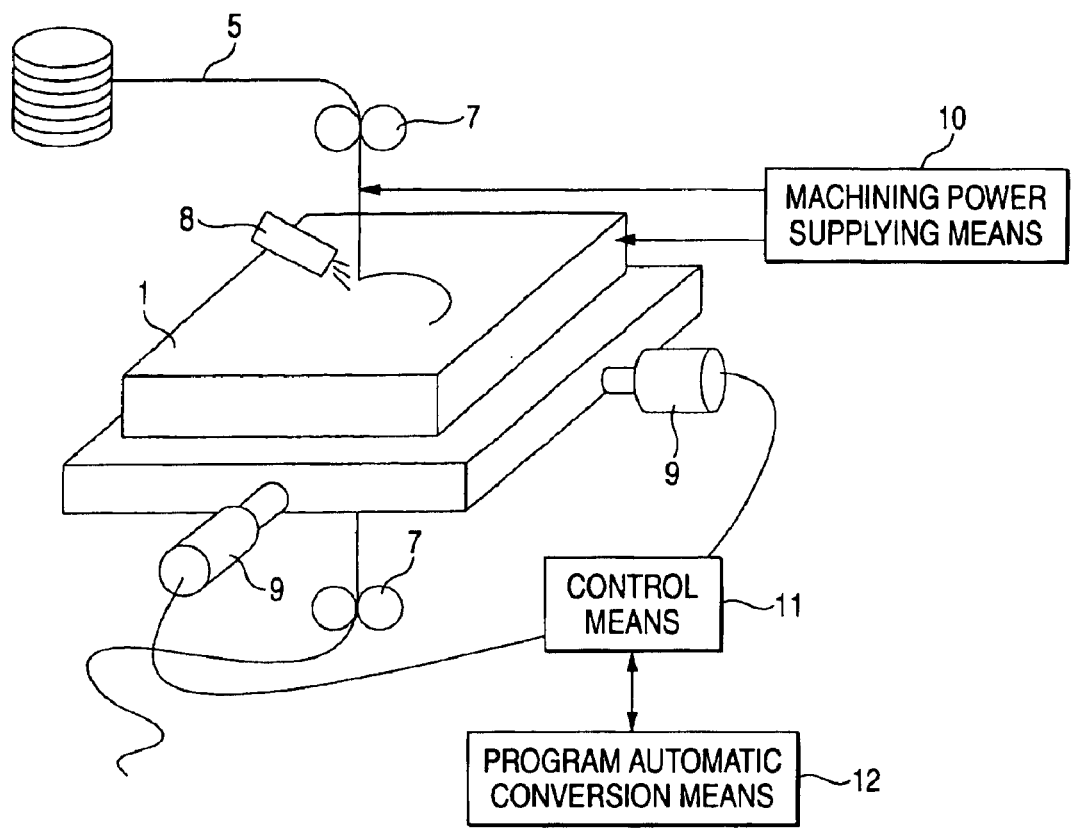
FIG. 8 is an explanatory view showing a constitution of the conventional wire electric discharge machining apparatus.
Figure 9:
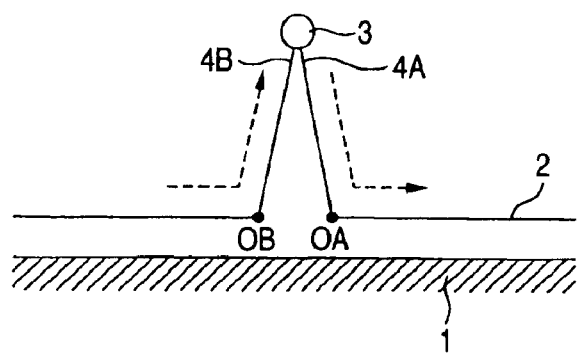
FIG. 9 is an explanatory view showing the electrode passage in the wire electric discharge machining apparatus of FIG. 8.

The operation will be described below. A basic operation of the wire electric discharge machining apparatus is the same as described in the background art with reference to FIG. 8, and is not described here. The working energy adjusting means 13 of FIG. 4 recognizes the position of the approach point to cancel the setting of the offset amount from a program describing the electrode passage stored in the control means 11, on the basis of the set information of the offset amount. For example, the coordinates of the center of the wire electrode at the time of starting the block of NC code describing the offset cancellation may be recognized. This recognition may be made when the control means 11 reads an NC program to draw an entire machining path on the display means, not shown, before machining. However, the control means within the wire electric discharge machining apparatus typically reads the NC program several blocks ahead from the machining block, whereby the recognition can be made during the machining, as well known. Also, the working energy adjusting means 13 calculates the distance between the coordinates of the approach point at which the setting of the offset is canceled during the machining and the coordinates of the center of the wire electrode at present in the machining configuration portion of the electrode passage, acquires the ratio of working energy to be charged, employing the working energy charge ratio table 14, and changes the parameters for the machining power supplying means 10 to decrease the working energy at a predetermined rate. For example, the quiescent time may be increased until the detected discharge frequency decreases to a value corresponding to a working energy decrease rate. The calculation of the distance between the coordinates of the approach point and the coordinates of the center of wire electrode may be made by using a well-known method of calculating the distance before a corner entrance for use in the corner control, for example.

For example, in the third cut, from an experiment involving a comparison between the case (A) where the working energy is not decreased near the approach point according to this invention and the case (B) where the working energy is decreased near the approach point according to this invention (using the working energy charge ratio table 14 of FIG. 5), it was confirmed that the depth of intrusion was about 4 $\mu$m in (A) and the intrusion is suppressed to the extent of a surface roughness for the machined face of the workpiece in (B).

As above described, with this invention, it is possible to suppress the intrusion from being formed on the machined face of the workpiece near the approach point, because the working energy is decreased in passing the approach point.

In the above description, in the case where the distance between the coordinates of the approach point and the coordinates of the center of wire electrode at present in the machining configuration portion of the electrode passage is within a range where the machining volume of the workpiece per unit movement distance of the wire electrode is decreased, the working energy per unit movement distance of the wire electrode is decreased to make the machining. However, by setting a second range within the range where the machining volume is decreased in accordance with a desired machining precision, the working energy per unit movement distance of the wire electrode may be decreased within this second range to make the machining. In this manner, it is also possible to suppress the intrusion from being formed on the machined face of the workpiece near the approach point.

In the above description, the working energy is decreased in returning from the configuration portion to the runway portion, or passing the approach point at the second time when the offset is canceled. However, the working energy may be decreased in entering from the runway portion to the configuration portion, or passing the approach point at the first time to set up the offset. Moreover, the working energy may be decreased in passing the approach point at the first time and in passing the approach point at the second time.

Also, in the above description, the working energy is adjusted, using the quiescent time. However, the working energy may be adjusted, employing the parameters having effect on the working energy, such as a peak current or an applied voltage. Alternatively, since it is necessary to decrease the working energy per unit movement distance, an electrode movement speed may be increased. That is, employing the electrode movement speed as the working energy adjusting means, the setting of the control means 11 may be changed without the setting of the machining power supplying means 10. When the working energy is decreased extremely, the working energy may be decreased in a desired manner by separating the machining power supplying means, or stopping the operation of an oscillator for generating the application timing of voltage pulse.

Also, in the above description, the working energy charge ratio is obtained, using the working energy charge ratio table 14. However, the working energy may be adjusted by defining a function between the distance from the approach point and the amount of adjusting the working energy and on the basis of the result calculated according to this function.

Also, in the above description, the amount of adjusting the working energy according to the number of making the finish machining as shown in FIG. 5 is exemplified. However, the amount of adjusting the working energy may be changed in accordance with the settings of the machining power supplying means, including the diameter and material of the wire electrode, the plate thickness and material of the workpiece, and the peak current, the servo settings such as an average machining voltage, and the setting of machining amount such as the offset amount to cope with various machining conditions.

Also, in the above description, the approach point is automatically recognized. However, the user may insert a special code into a route program designating the point of starting adjusting the working energy at or near the approach point.

INDUSTRIAL APPLICABILITY

As above described, the wire electric discharge machining method and apparatus according to the invention is particularly suitable for the wire electric discharge machining requiring a high machining precision.

What is claimed is:

1. A wire electric discharge machining method for machining a workpiece by electric discharge by relatively moving a wire electrode and said workpiece while supplying a working energy between said wire electrode and said workpiece, characterized in that said working energy per unit movement distance of said wire electrode is decreased when the distance between an approach point connecting a runway portion and a machining configuration portion on the relative movement passage and a center of said wire electrode in said machining configuration portion is within a range where the machining volume of said workpiece per unit movement distance of said wire electrode is decreased.

2. A wire electric discharge machining method for machining a workpiece by electric discharge by relatively moving a wire electrode and said workpiece while supplying a working energy between said wire electrode and said workpiece, characterized in that said working energy per unit movement distance of said wire electrode is decreased when the distance between an approach point connecting a runway portion and a machining configuration portion on the relative movement passage and a center of said wire electrode in said machining configuration portion is within a second range that is set to be smaller than a range where the machining volume of said workpiece per unit movement distance of said wire electrode is decreased.

3. The wire electric discharge machining method according to claim 1 or 2, characterized in that said working energy is decreased as the distance between said approach point and the center of said wire electrode is smaller.

4. The wire electric discharge machining method according to claim 1 or 2, characterized in that said working energy is decreased in accordance with an adjustment amount that is preset depending on the machining conditions.

5. The wire electric discharge machining method according to claim 1 or 2, characterized in that said working energy is decreased at least either when the wire electrode passes said approach point at the first time to enter from the runway portion to the machining configuration portion on said relative movement passage, or when it passes said approach point at the second time to return from the machining configuration portion to the runway portion on said relative movement passage.

6. A wire electric discharge machining apparatus for machining a workpiece by electric discharge in which driving means relatively moves a wire electrode and said workpiece while machining power supplying means supplies a working energy between said wire electrode and said workpiece, characterized by comprising working energy adjusting means for decreasing said working energy per unit movement distance of said wire electrode when the distance between an approach point connecting a runway portion and a machining configuration portion on the relative movement passage and a center of said wire electrode in said machining configuration portion is within a range where the machining volume of said workpiece per unit movement distance of said wire electrode is decreased.

7. A wire electric discharge machining apparatus for machining a workpiece by electric discharge in which driving means relatively moves a wire electrode and said workpiece while machining power supplying means supplies a working energy between said wire electrode and said workpiece, characterized by comprising working energy adjusting means for decreasing said working energy per unit movement distance of said wire electrode when the distance between an approach point connecting a runway portion and a machining configuration portion on the relative movement passage and a center of said wire electrode in said machining configuration portion is within a second range that is set to be smaller than a range where the machining volume of said workpiece per unit movement distance of said wire electrode is decreased.

8. The wire electric discharge machining apparatus according to claim 6 or 7, characterized in that said working energy adjusting means decreases said working energy as the distance between said approach point and the center of said wire electrode is smaller.

9. The wire electric discharge machining apparatus according to claim 6 or 7, characterized in that said working energy adjusting means decreases said working energy in accordance with an adjustment amount that is preset depending on the machining conditions.

10. The wire electric discharge machining apparatus according to claim 6 or 7, characterized in that said working energy adjusting means decreases said working energy at least either when the wire electrode passes said approach point at the first time to enter from the runway portion to a machining configuration portion on said relative movement passage, or when it passes said approach point at the second time to return from the machining configuration portion to the runway portion on said relative movement passage.

* * * * *